United States Patent [19]

Jour et al.

[11] Patent Number: 4,838,699
[45] Date of Patent: Jun. 13, 1989

[54] CEMENT MIXING PROCESS

[75] Inventors: Jean-Paul Jour; Jacques Orban; André Salvaire, all of Saint-Etienne, France

[73] Assignee: Etudes et Fabrication, France

[21] Appl. No.: 694,379

[22] Filed: Jan. 24, 1985

[30] Foreign Application Priority Data

Feb. 21, 1984 [FR] France ................................ 84 02594

[51] Int. Cl.⁴ ............................ B28C 1/16; B01F 5/08
[52] U.S. Cl. .......................................... 366/2; 137/14; 137/494; 366/340; 366/348
[58] Field of Search ................... 366/1, 2, 6, 51, 77, 366/176, 190, 192, 340, 341, 348; 137/14, 494, 504; 166/285

[56] References Cited

U.S. PATENT DOCUMENTS

| | | | |
|---|---|---|---|
| 2,817,500 | 12/1957 | Robinson | 366/176 X |
| 3,179,385 | 4/1965 | Deackoff | 366/176 X |
| 3,805,824 | 4/1974 | Robbins, Jr. | 137/504 |
| 4,199,267 | 4/1980 | Hendrikz | 366/176 X |
| 4,383,769 | 5/1983 | Pandolfe | 366/340 X |

Primary Examiner—Philip R. Coe
Attorney, Agent, or Firm—S. A. Littlefield

[57] ABSTRACT

The invention relates to a process for improving the characteristics of a fluid and in particular of a cement slurry for the cementing of wells, particularly of oil wells, wherein it consists in applying to this fluid an energy of between 4.8 and 6.3 kJ/kg, by incorporating adapted pressure drops, in line, before the well head and at the outlet of a high-pressure pump, said pressure drops being substantially independent of the flowrate. The invention also relates to a device for carrying out this process.

4 Claims, 2 Drawing Sheets

CEMENT MIXING PROCESS

The present invention relates to the operations of cementing of wells, particularly of oil drilling wells. It is known that cement slurries are prepared outside the well, are injected into the tubing, and generally rise in the annular space lying between the bore and the tubing, where the cement is left to set. This specification will not go into the numerous problems posed by this technique in detail, but the main properties that a cement slurry must present in order to be used in this domain will nonetheless be emphasized.

These properties may be classified under two principal points: rheology and setting time.

The characteristics of rheology are essentially the plastic viscosity and the yield value.

In the setting time are included the thickening time and the setting time.

The so-called "free water" characteristic is also a well known characteristic.

These different properties are measured by the man skilled in the art in accordance with likewise well known standards, the API standards.

These standards describe laboratory mixing techniques which make it possible to anticipate the properties of the slurry. However, one of the major problems encountered during mixing, no longer in the laboratory but on the field, lies in the virtual impossibility of reproducing the properties aimed at and obtained in the laboratory. This is mainly due to the impossibility of extrapolating the results obtained with small-dimensioned laboratory mixers.

It is an object of the present invention:

(1) to improve the essential characteristics of cement slurries referred to hereinabove, (2) to optimalize in these slurries the action of conventional chemical additives and (3) to allow, for the first time, good reproducibility of the characteristics.

It will be noted that the process according to the invention is virtually instantaneous, failing which reproducibility could not be attained.

The conventional mixing equipment generally comprises a mixer in which water and the dry cement are brought into contact, then one or more vessels for receiving the slurry, connected to one another, then one or more centrifugal pumps for recirculating the slurry and for supplying high-pressure pumps. By a simple calculation, the energy applied to the slurry thus prepared may be estimated at a value of between 0.5 and 2 kJ/kg (kilojoule/kilogram) in the best of cases.

In the prior art, the quantity of energy applied is essentially limited by the phenomena of wear of the equipment and of actual implementation of the technique.

An essential original feature of the present invention resides in the fact that energy by far greater than that a present applied in the known processes will be applied to the slurry which has already been prepared.

According to the present invention, an amount of energy per unit of mass of the prepared slurry of between 4.8 and 6.3 kJ/kg will be applied.

The amount of energy applied per unit of mass of the slurry will preferably be included between 5 and 6 kJ/kg, and preferably still, will be close to 5.5 kJ/kg.

The invention has shown that it is essential, in order to obtain the results envisaged, to apply this energy by introducing a pressure drop of determined characteristics on the slurry circuit at the outlet of the high-pressure pump (or one of the high-pressure pumps).

Such pressure drops may be obtained by in-line insertion, at the outlet of a high-pressure pump, of devices disposed in series and/or in parallel and adapted to be controlled so as to create a substantially constant total pressure drop as a function of the flowrate.

The introduction of this pressure drop will preferably be made by a restriction of the section of the conduit where the slurry is circulating.

When such a restriction is used for creating a pressure drop, the principal drawbacks of the system arise firstly from the close dependence between the following parameters:

flowrate (Q)
pressure drop (P)
section of the conduit at the restriction (A)
density of the fluid ($\rho$)
coefficient characterizing the geometry of the restriction (K).

This dependence is expressed by the following formula:

$$P = (\rho \times Q^2)/(2k^2 \times A^2).$$

In this way, for a given restriction, the pressure increases with the square of the flowrate. This is quite incompatible with use on the field, where is is absolutely impossible to impose a constant flowrate. It is therefore impossible, at present, to ensure a constant pressure drop since it is impossible not to allow the flowrate to vary.

Furthermore, it is clear that, if it is impossible to control the pressure drop, it will be impossible to control the characteristics of the slurry.

Another of the original features of the invention resides in a device for introducing into the slurry circuit, at the outlet of a high-pressure pump, a pressure drop substantially independent of the flowrate.

A further original feature of the invention lies in the determination of a preferred geometry for this device, and the choice of a material, these two characteristics cooperating to avoid excessive wear of said device.

It is also known that the risk of plugging, with that of wear, automatically appears when a restriction of section is introduced in a conduit of fluid laden with solid particles. The equipment according to the invention avoids this drawback.

The present invention therefore proposes a process for treating slurry in order to improve the characteristics thereof necessary for good cementation, and this by introducing a pressure drop of determined characteristics at the outlet of a high-pressure pump, and a device for carrying out this process in particularly preferred manner, an advantageous variant corresponding to the use of a particular geometry of the essential part of this device and of an anti-wear material.

The invention will be more readily understood on reading the following description with reference to the accompanying drawings, in which.

Figure 1:
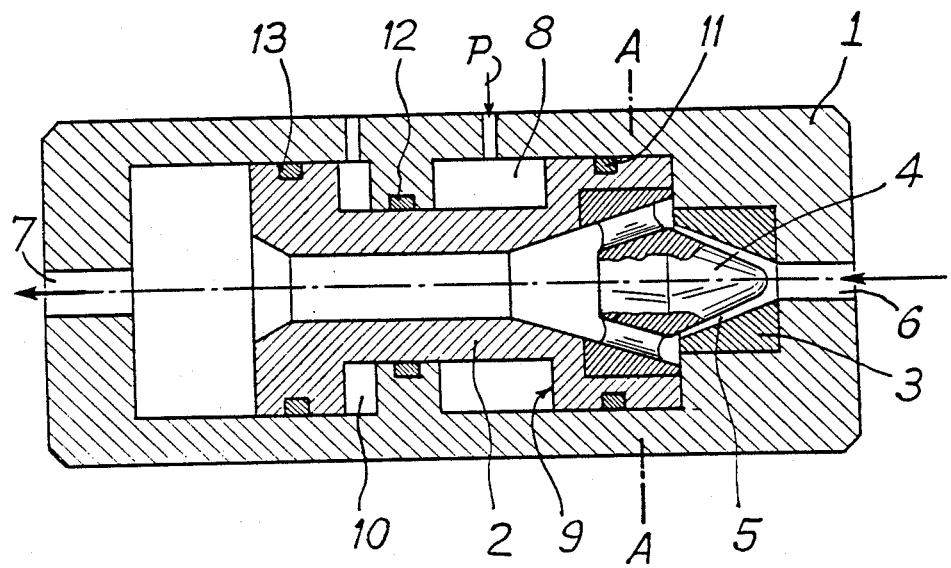
FIG. 1 shows a view in section of the device according to the present invention.

Referring now to the drawings, in FIGS. 1 to 5, like references denote like elements, as follows:
1: body
2: plunger
3: seat
4: needle
4bis: section of needle (variant)
4ter: section of needle (other variant)
5: annular area for passage of slurry
6: input port for slurry
7: output port for slurry
8: (pressure balance) chamber
9: annular wall
10: internal chamber
11: seal
12: seal
13: seal
14: seat
16: active part of the cone
17: arm
18: wear part
P. constant and adjustable pressure applied in chamber 8
s,s': input and output surfaces, respectively
r: radius of curvature
ap: vertex angle of needle
as: vertex angle of seat The accompanying Figures are not necessarily to scale.

FIG. 1 schematically shows an axial section through a device according to the present invention. The slurry penetrates into the body 1 via the input port 6, passes through the annular area 5 intended for passage of the slurry and formed between the seat 3 and the needle 4 itself fast with the plunger 2. The fluid emerges via the output port 7. The force created by the pressure drop at the restriction, and exerted on the needle 4, is transmitted to the plunger 2 which is fast therewith. This plunger is mobile in body 1, by sliding along the longitudinal axis of the device. Under the effect of said force, the plunger is pushed towards the output port 7, and this movement is stopped when said force is exactly balanced by the force created by a constant pressure P which is applied in the chamber 8, force which is exerted on the annular wall 9 of the plunger. The chamber 10 is connected for example to atmospheric pressure. The chamber 8 is isolated from the slurry by seal 11, the two chambers 8 and 10 are isolated from each other by seal 12, and chamber 10 is isolated from the slurry by seal 13. The characteristics of these seals are of course adapted to the function thereof.

The preferred manner of applying a constant pressure at the level of chamber 8 will be to use a hydraulic, pneumatic or hydropneumatic system. Such systems are known and it is unnecessary to describe them here.

It appears possible to use a different system, of the spring type, either alone or in combination with another system. However, the spring system presents the major drawback of considerably elongating the device.

The function of the apparatus according to the invention is therefore to control the pressure difference between the input and the output.

Figure 2:
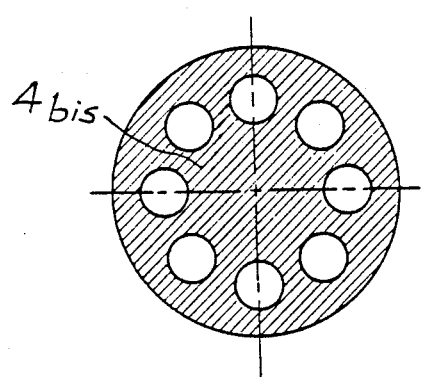
FIG. 2 shows a view in section of the plunger incorporated in this device, according to a variant of the invention.
Figure 3:
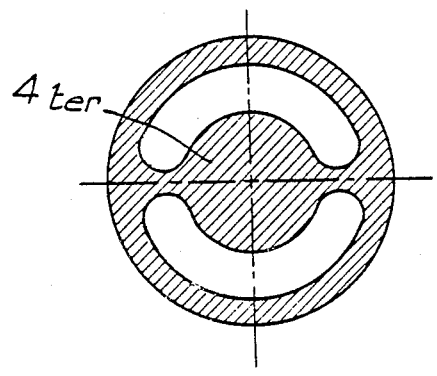
FIG. 3 shows a view in section of the plunger incorporated in the device according to the invention, in another variant of the invention.

FIGS. 2 and 3 show the needle in cross section, in two possible variants, along A-A of FIG. 1. The free passage refered to hereinabove as "annular area" may be constituted by an assembly of cylindrical orifices disposed on the periphery of the cross section (FIG. 2), or by the combination of two (or more) orifices of the type shown in FIG. 3.

Figure 5:
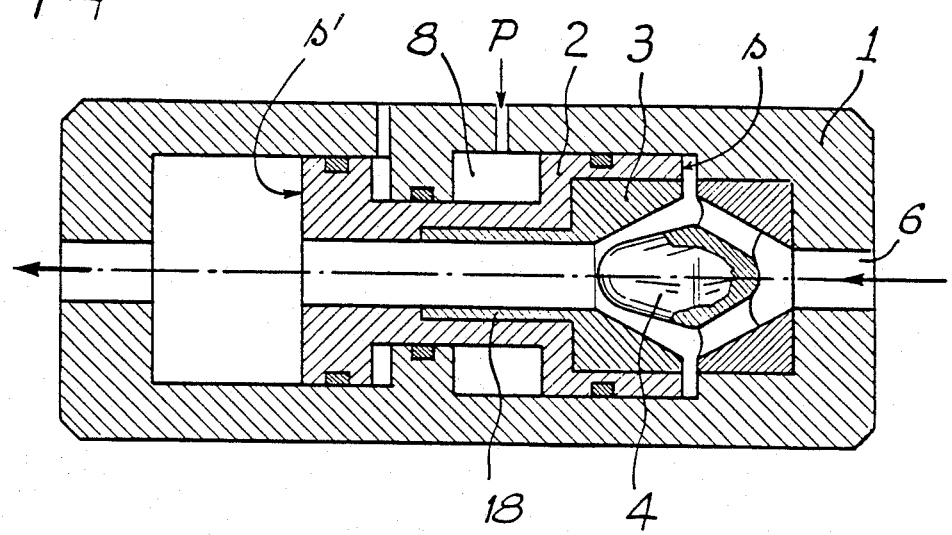
FIG. 5 shows a view in section of a device according to the invention, according to a further variant.

FIG. 5 schematically shows an axial section through a device according to the invention, in another variant. According to this variant, the needle 4 is bound to the body 1 near the input port 6. The seat 3 is bound to the plunger 2. The pressure at the input acts on the surface s. Balance is obtained by the force exerted on the output surfaces' and the force resulting from the pressure created in the internal chamber 8.

As indicated above, the device according to the invention is placed at the output of at least one of the high-pressure pumps.

Other variants may of course be envisaged by the man skilled in the art.

It has been shown, according to the present invention, that, in order to resist the intense wear caused by the particles in suspension in the slurry, the geometry of the needle had, at the level of the active part of the cone, to be a cone whose vertex angle had to be equal to the vertex angle of the cone of the seat multiplied by a coefficient of between 1 and 2. This preferred geometry will be defined with the aid of FIG. 4 which shows the vertex angle of the needle (ap) and the vertex angle of the seat (as).

Figure 4:
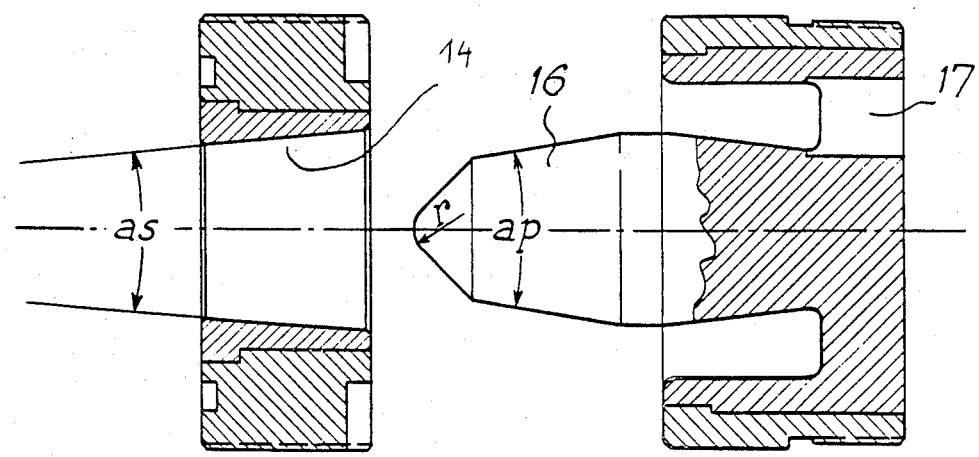
FIG. 4 shows the plunger and the seat incorporated in the device, according to a particularly preferred variant of the invention (special geometry of the cones)

FIG. 4 shows a detailed view of a variant of the needle (and of the corresponding seat shown spaced apart for greater clarity. The needle/seat relation is the one shown in FIG. 1) of a device according to the invention. This variant corresponds to a preferere geometry which will be described hereinbelow. The angle of cone of the seat is 10° and the angle of cone of the active part of the needle 16 is 20°, according to this preferred variant. As will be seen hereinbelow, it will be particularly advantageous to use a titanium carbide as material for constituting the needle and the seat corresponding to FIG. 4, or at least to coat said needle and seat with this material.

As shown in FIG. 4, the cone of the needle will preferably be interrupted and will terminate in a substantially spherical geomtry of large radius of curvature r. The phenomena of cavitation which appear in known manner about such a geometry will thus be avoided or at least rendered compatible with industrial use. The device shown in FIGS. 1 to 5 also avoids plugging of the annular area without increase in the pressure drop.

The respective positions of the seat and of the needle may be reversed as shown in FIG. 5. In this case, the pressure drop acts on the seat which is bound, according to this variant, to the plunger. The seat is then subjected to a contrary force born of the controlled pressure existing in chamber 8. As indicated above in connection with FIG. 1, the balance which is established enables the pressure drop to be controlled.

The angles described above for the respective cones defining the seats and the needle are likewise reversed, which leads to the needle presenting a vertex angle at the most equal to the vertex angle of the seat.

The equipment of the present invention may also be used as controllable and adjustable safety relief valve, subject to minor changes. To this end, it is simply necessary to modify the stroke of the plunger so as to obtain a watertight assembly between the body and the plunger. The surface offered to the action of the pressure at the input multiplied by pressure of opening must be equal to the product of the surface of the chamber by the pressure maintained constant and prevailing in said chamber 8 as described hereinabove. In this case, the pressure range in which the apparatus may operate is much greater than if springs are used, as in numerous presently existing safety relief valves, and this depends solely on the range in which the constant pressure prevailing in chamber 8 may be controlled. Moreover, it is possible to vary the control pressure and therefore the safety pressure, at any moment, when said device is used, without stopping pumping.

In the two different applications described in detail hereabove, the seat and the needle must be made of hard materials, or must at least be sufficiently coated with such hard materials, such as for example titanium carbide, tungsten carbide or ceramic, to resist industrial wear, in particular when abrasive fluids and particularly cement slurry in the oil drilling industry are pumped.

According to the present invention, a titanium carbide alloy will preferably be used, and, preferably still, the use of this alloy will be combined with a geometry such as that described in FIG. 4.

The titanium carbide alloy may also be used to make the wear parts provided in the device shown in FIG. 5. A THYSSEN alloy with 40% titanium carbide will preferably be used.

The following example illustrates the invention without limiting the scope thereof.

EXAMPLE

This example concerns the use of the device shown in FIG. 1. The cylinder of the body has a diameter of 200 mm (7.8 inches), is 500 mm (19.7 inches) long, and presents input and output conduits with an inner diameter of 46 mm (1.8 inch).

The following characteristics and parameters are obtained:
working pressure of 70 M.Pa with abrasive fluids such as cement slurries and baryte mud,
pressure drop of 0 to 20 M.Pa,
hydraulic control pressure in chamber 8 from 0 to 10 M.Pa,
nominal flowrate of 1300 l/min (343 gal./min),
variation of pressure drop of less than 20% for a variation in flowrate of 200 to 1500 l/min (53 to 396 gal./min), the pressure in chamber 8 being maintained constant according to the present invention.

This example shows that the pressure drop introduced at the output of a high-pressure pump is maintained substantially constant despite a very considerable variation of the flowrate, and that considerable additional energy is thus applied to the treated fluid.

PROPERTIES OBTAINED

The cement slurries as described in the Table hereinbelow were prepared.

Certain essential properties (cf. the Table) were measured:
in the laboratory after mixture according to the API standards;
under real conditions on the field after conventional mixing;
under real conditions on the field after mixing employing the introduction according to the invention of a pressure drop increasing the total energy supplied to the slurry up to the value of 5.5 kJ/kg of slurry.

The accompanying Table clearly shows that the process according to the invention makes it possible to reproduce the estimates obtained in the laboratory, much more faithfully.

TABLE

| | Type of slurry | | | | Conditions of mixing | | |
|---|---|---|---|---|---|---|---|
| TEST | Class of cement (1) (API) | Additive (2) | Specific gravity | Characteristics measured | On the field | In the laboratory, API standards | On the field with insertion of the pressure according to the invention |
| 1 | A | 0.124 | 1.87 | Compressive strength (3) | 25 | 30 | 32 |
| 2 | G | 0.05 | 1.90 | Plastic viscosity (4) | 29 | 24 | 26 |
| 3 | G | 0.05 | 1.95 | Yield value (5) | 13.4 | 16.3 | 18.2 |
| 4 | G | 0.05 | 1.95 | Plastic viscosity (4) | 40 | 35 | 34 |
| 5 | G | 0.05 | 1.92 | Maturation time (6) | 270 | 180 | 210 |
| 6 | G | none | 1.90 | Yield value (5) | 15.81 | 19.16 | 21.07 |
| 7 | G | none | 1.90 | Plastic viscosity (4) | 45 | 39 | 38 |
| 8 | G | 0.08 | 1.90 | Sedimentation | yes | no | no |

(1) Class A:
Class G: marketed by CEMOIL
(2) expressed in gal./sk of dry cement
The product is a dispersant - (sodium salt of condensation product of β-naphtalene - sulphonic acid with formaldehyde).
(3) expressed in MPa
(4) expressed in cP
(5) expressed in Pa
(6) expressed in minutes, with direct correction in thickening time.

What is claimed is:
1. A process for homogenizing an abrasive fluid comprising the steps of applying to said fluid an energy of between 4.8 and 6.3 kJ/kg by pumping said fluid through a high pressure pump including at least one annular restriction, in line, at an outlet of said pump and mixing said fluid in said at least one annular restriction whereby a pressure drop through said at least one annular restriction is substantially independent of flow rate.

2. The process of claim 1, wherein an energy of 5 to 6 kJ/kg is applied to the fluid.

3. The process of claim 1, wherein an energy close to 5.5 kJ/kg is applied to the fluid.

4. The process of claim 1, wherein said fluid consists of a cement slurry for cementing wells.

* * * * *